Aug. 30, 1966      P. F. GIRARD      3,269,674

FLEXIBLE WING WITH PITCH STABILIZING MEANS

Filed June 26, 1964      2 Sheets-Sheet 1

*INVENTOR.*
PETER F. GIRARD
BY Knox & Knox

United States Patent Office 3,269,674
Patented August 30, 1966

3,269,674
FLEXIBLE WING WITH PITCH STABILIZING MEANS
Peter F. Girard, La Mesa, Calif., assignor to The Ryan Aeronautical Co., San Diego, Calif.
Filed June 26, 1964, Ser. No. 378,213
5 Claims. (Cl. 244—48)

The present invention relates to aircraft and more particularly to a flexible wing aircraft with pitch stabilizing means.

The basic flexible wing is a stable aerodynamic platform in most respects in normal flight. However, at or near zero lift, the wing has a negative pitching moment and becomes longitudinally unstable at lift coefficients below about 0.75. This can be overcome to some extent by suspending the payload so that the center of gravity is well below the wing, providing pendulum stability. Such a requirement limits the adaptability of the flexible wing to various uses and results in a complex supporting and control structure of undesirable weight and high drag. The versatility of the flexible wing would be increased and structure greatly simplified by mounting the payload directly on, or even incorporated into the wing, but longitudinal stability must be provided under all flight conditions.

It is, therefore, the primary object of this invention to provide a flexible wing having a separated forward wing portion forming a slotted configuration which acts to prevent a negative pitching action at low or zero lift conditions.

Another object of this invention is to provide a flexible wing wherein the angle of incidence of the forward wing portion is variable to control the lift coefficient of the wing for trim control under varying conditions, or even for pitch control of the wing.

A further object of this invention is to provide a flexible wing wherein the movable forward wing portion is, in effect, part of the basic wing, so that structural simplicity is maintained and the simple form of the wing is unbroken.

Figure 1:
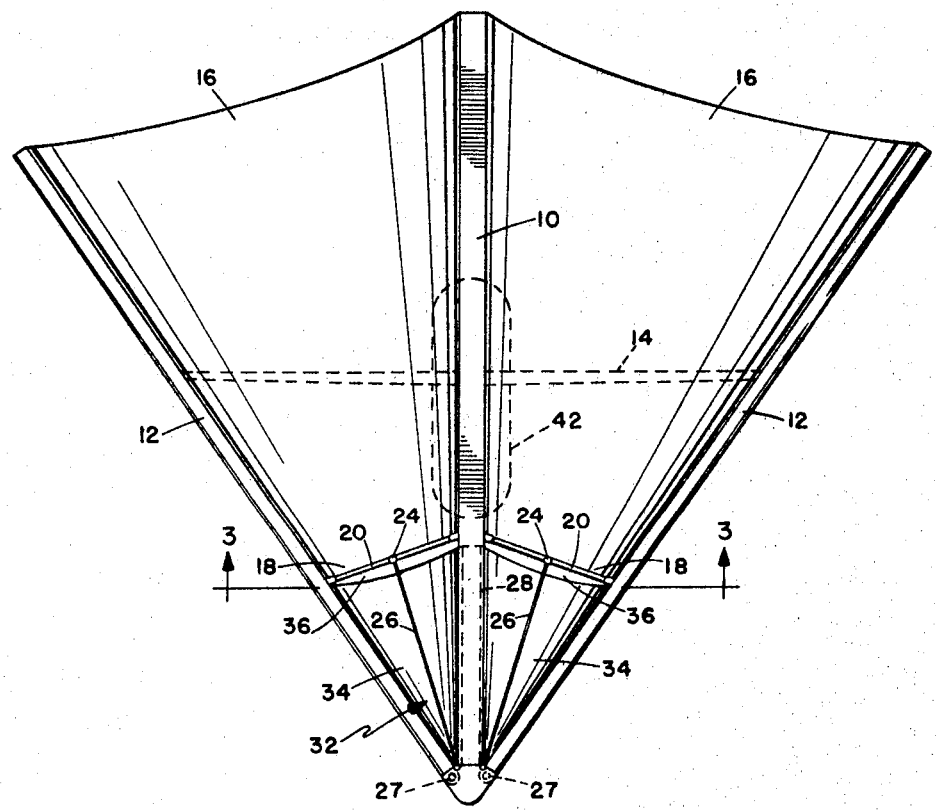
Figure 2:
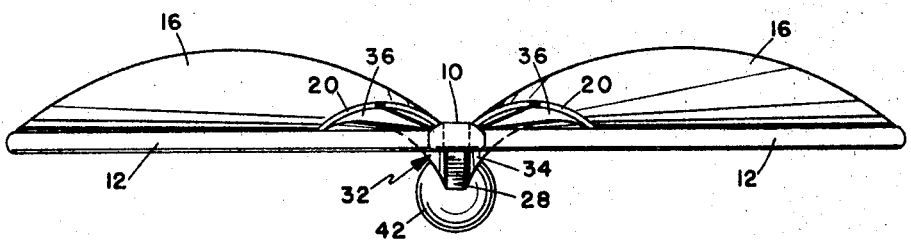
Figure 3:
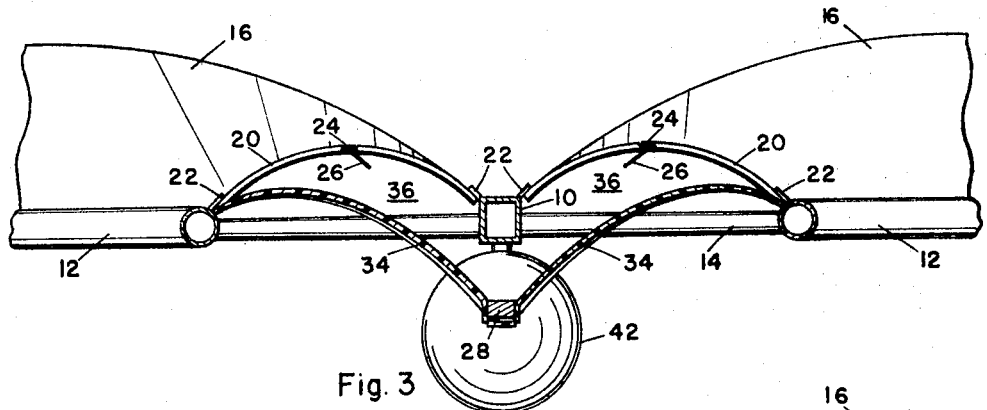
Figure 4:
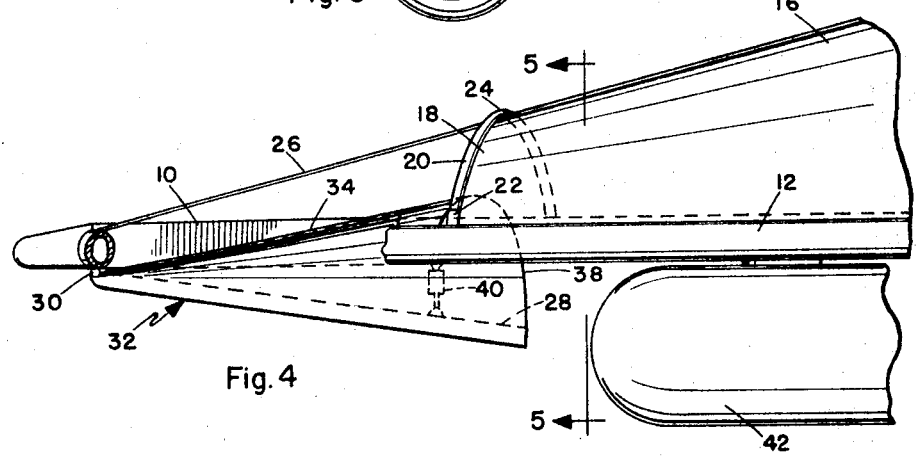
Figure 5:
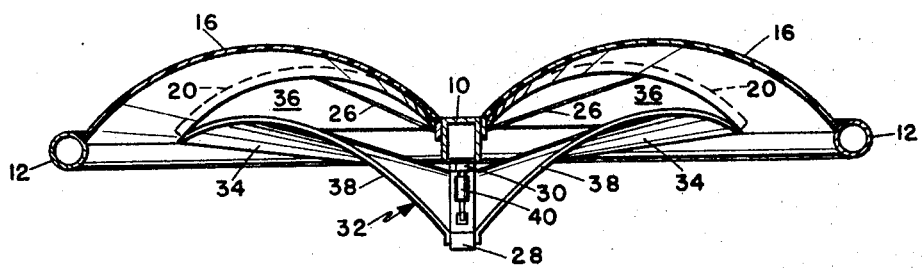

In the drawings:
FIGURE 1 is a top plan view of the wing;
FIGURE 2 is a front elevation view thereof;
FIGURE 3 is an enlarged sectional view taken on line 3—3 of FIGURE 1;
FIGURE 4 is an enlarged side elevation view of the forward wing portion, partially cut away; and
FIGURE 5 is a sectional view taken on line 5—5 of FIGURE 4.

Similar characters of reference indicate similar or identical elements and portions throughout the specification and throughout the views of the drawing.

*Wing construction*

The general construction of the basic flexible wing is well known and comprises a rigid, longitudinal central keel 10, with rigid leading edge members 12 extending angularly rearwardly from the forward end of the keel, the leading edge members being held at the proper angle of sweepback by a spreader bar 14 extending on opposite sides of the keel. Extending between the keel 10 and leading edge members 12 are lifting panels 16 of flexible material, such as rubberized fabric or the like, the panels being secured along their edges to the rigid structural members. The materials and structure of the rigid members and the method of attachment of the lifting panels thereto will depend on the size and purpose of the wing.

In the configuration illustrated, the lifting panels 16 do not extend to the forward end of keel 10, but are cut transversely from the keel to the leading edge members 12 at some distance aft of the forward end. The laterally extending forward edges 18 of lifting panels 16 are supported by upwardly bowed struts 20 to hold the bowed form which the lifting panels assume in flight. Struts 20 are pivotally attached at their ends to the keel 10 and leading edge members 12 by hinge fittings 22 and have intermediate hinges 24 so that they can be folded. Drag wires 26 extend from hinges 24 to the forward end of keel 10 to prevent the struts 20 from folding under aerodynamic load. The folding of the struts is not essential, but the foldability of the flexible wing for storage is a desirable asset and the present structure does not interfere with the folding in any way. For folding the wing the leading edge members 12 would be attached to keel 10 by hinges 27, and spreader bar 14 would be detachable in any suitable manner.

Below the forward portion of keel 10 is a sub keel 28, which is secured to the main keel by a hinge 30 at its forward end, so that the sub keel can swing in a substantially vertical plane. The sub keel 28 supports a fore plane 32 comprising a pair of flexible forward wing panels 34 secured between said sub keel and the leading edge members 12 in a manner similar to the main lifting panels. The forward panels 34 take the place of the removed portions of the main lifting panels, but are spaced below the lifting panels so that slots 36 are formed therebetween. Trailing edges 38 of the forward panels 34 are free to bow upwardly under aerodynamic load, as do the lifting panels 16. To raise and lower sub keel 28 an actuator 40 is connected between said sub keel and the keel 10. Actuator 40 may be a fluid jack, screw mechanism, or any other suitable type of linear actuator.

A typical payload unit 42 is illustrated as mounted directly below the keel 10, and may be a cargo container, a passenger cabin, or any other structure of a similar nature. In large aircraft the payload unit could be incorporated into the keel, or the keel could, in effect, become a fuselage, since the vertical position of the center of gravity is not critical.

*Operation*

A control system for the wing has been omitted since there are various systems which may be used. One such system is described in my U.S. Patent No. 3,135,483, entitled Auxiliary Boom Control for Rogallo Type Wing Aircraft, which provides pitch and roll control. Another system which provides roll control is described in my copending application Serial No. 260,608, for an Articulated Spreader Bar Lateral Control System for Flexible Wing Aircraft.

In flight the sub keel 28 is always inclined relative to keel 10, so that the fore plane 32 has a positive angle of incidence relative to the main wing. When the wing reaches a condition of zero or near zero lift and tends to pitch down, the fore plane 32 still has a non-critical lift coefficiicent and produces a positive pitching moment. Since the fore plane is offset below the main wing, air can flow through slots 36 and the airflow over the fore plane is unobstructed. Fore plane 32 can thus operate efficiently when the lift of lifting panels 16 has deteriorated. The lift of fore plane 32 at the extreme forward end of the wing produces a powerful lifting moment which opposes any nose down pitching and maintains the wing in stable position.

By means of actuator 40 the angle of incidence of fore plane 32 can be varied to adjust the trim of the wing by changing the overall effective lift coefficient. With a sufficient range of adjustment the fore plane could be used as a pitch control surface, since flexible wing aircraft are not normally subjected to extreme maneuvers.

The basically simple structure of the flexible wing has been maintained, with no breaks in the load bearing members and no change in the desirable characteristics of the wing. Longitudinal stability over a wide speed range, including the normally critical low speeds, has been provided by incorporating a negative pitch damping element into the basic wing, with provision for adjustment to suit varying conditions. The structure is adaptable to powered aircraft, or gliders, either manually, automatically, or remotely controlled.

It is understood that minor variation from the form of the invention disclosed herein may be made without departure from the spirit and scope of the invention, and that the specification and drawings are to be considered as merely illustrative rather than limiting.

I claim:
1. A flexible wing, comprising:
a rigid longitudinal keel;
leading edge members extending angularly rearwardly from the forward end of said keel on opposite sides thereof;
flexible lifting panels secured to and between said keel and said leading edge members;
the forward portions of said lifting panels being separated therefrom and constituting a fore plane, with slots between the fore plane portions and the respective lifting panels extending from opposite sides of said keel to said leading edge members;
said fore plane having a positive angle of incidence relative to the major portion of the wing.

2. A flexible wing according to claim 1 and including means to adjust the angle of incidence of said fore plane.

3. A flexible wing, comprising:
a rigid longitudinal keel;
leading edge members extending angularly rearwardly from the forward end of said keel on opposite sides thereof;
flexible lifting panels secured to and between said keel and said leading edge members;
a sub keel mounted below the forward portion of said keel and being pivotally connected thereto at its forward end to swing downwardly below the keel;
the forward portions of said lifting panels being separated therefrom and being secured between said leading edge members and said sub keel to constitute a fore plane;
and means to adjust the inclination of said sub keel relative to said keel, whereby the angle of incidence of said fore plane is variable relative to that of the major portion of the wing.

4. A flexible wing, comprising:
a rigid longitudinal keel;
leading edge members extending angularly rearwardly from the forward end of said keel on opposite sides thereof;
flexible lifting panels secured to and between said keel and said leading edge members;
a sub keel mounted below the forward portion of said keel and being pivotally connected thereto at its forward end to swing downwardly below the keel;
the forward panel portions of said lifting panels being separated therefrom and defining slots extending laterally from said keel to said leading edge members;
the forward edges of said lifting panels having upwardly bowed supporting struts secured thereto between said keel and said leading edge members;
said forward panel portions being secured to and between said leading edge members and said sub keel and constituting a fore plane, the trailing edges of said fore plane being freely flexible; and
means to adjust the inclination of said sub keel relative to said keel, whereby the angle of incidence of said fore plane is variable relative to that of the major portion of the wing.

5. A flexible wing according to claim 4, wherein said bowed struts and said leading edge members are hinged to permit folding of the wing.

References Cited by the Examiner
UNITED STATES PATENTS

| 1,861,318 | 4/1932 | Page | 244—42 |
|---|---|---|---|
| 2,381,679 | 9/1945 | Maxwell | 244—42 |

OTHER REFERENCES

Hewes, D. E.: Free-Flight Investigation of Radio-Controlled Models with Parawings, NASA Technical Note D–927, September 1963, pages 1, 21, 22.

Johnson and Hassell: NASA Technical Note D–1946, September 1963, pages 28–32.

Tibby, C. E.: NASA Technical Note D–2044, December 1963, page 13.

MILTON BUCHLER, *Primary Examiner.*

B. BELKIN, *Assistant Examiner.*